US006589804B1

United States Patent
Halliyal et al.

(10) Patent No.: US 6,589,804 B1
(45) Date of Patent: Jul. 8, 2003

(54) OXIDE/NITRIDE OR OXIDE/NITRIDE/ OXIDE THICKNESS MEASUREMENT USING SCATTEROMETRY

(75) Inventors: Arvind Halliyal, Sunnyvale, CA (US); Bhanwar Singh, Morgan Hill, CA (US); Ramkumar Subramanian, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/904,089

(22) Filed: Jul. 12, 2001

(51) Int. Cl.$^7$ .............................................. H01L 21/00
(52) U.S. Cl. ...................................................... 438/22
(58) Field of Search ..................... 438/22, 14; 156/378; 356/237

(56) References Cited

U.S. PATENT DOCUMENTS

| | | | | |
|---|---|---|---|---|
| 5,416,594 A | * | 5/1995 | Gross et al. | 356/237 |
| 5,863,379 A | * | 1/1999 | Uchida et al. | 156/378 |
| 6,072,191 A | * | 6/2000 | La et al. | 257/48 |

OTHER PUBLICATIONS

Niu, X., et al., "*Specular Spectroscopic Scatterometry in DUV Lithography,*" Timbre Technology, Inc., et al.
Smith, T., et al., "*Process Control in the Semiconductor Industry,*" http://www–mtl.mit.edu/taber/Research/Process Control/IERC99/ pp1–24.
Cote, D.R., et al., "*Plasma–assisted chemical vapor deposition of dielectric thin films for ULSI semiconductor circuits,*" IBM Journal of Research & Development, vol. 43, No. 1/2 pp 1–30.

* cited by examiner

Primary Examiner—David Nelms
Assistant Examiner—Thao Le
(74) Attorney, Agent, or Firm—Amin & Turocy, LLP

(57) ABSTRACT

A system for regulating ON and/or ONO dielectric formation is provided. The system includes one or more light sources, each light source directing light to one or more oxide and/or nitride layers being deposited and/or formed on a wafer. Light reflected from the oxide and/or nitride layers is collected by a measuring system, which processes the collected light. The collected light is indicative of the thickness and/or uniformity of the respective oxide and/or nitride layers on the wafer. The measuring system provides thickness and/or uniformity related data to a processor that determines the thickness and/or uniformity of the respective oxide and/or nitride layers on the wafer. The system also includes a plurality of oxide/nitride formers; each oxide/ nitride former corresponding to a respective portion of the wafer and providing for ON and/or ONO formation thereon. The processor selectively controls the oxide/nitride formers to regulate oxide and/or nitride layer formation on the respective ON and/or ONO formations on the wafer.

13 Claims, 14 Drawing Sheets

Prior Art Fig. 1

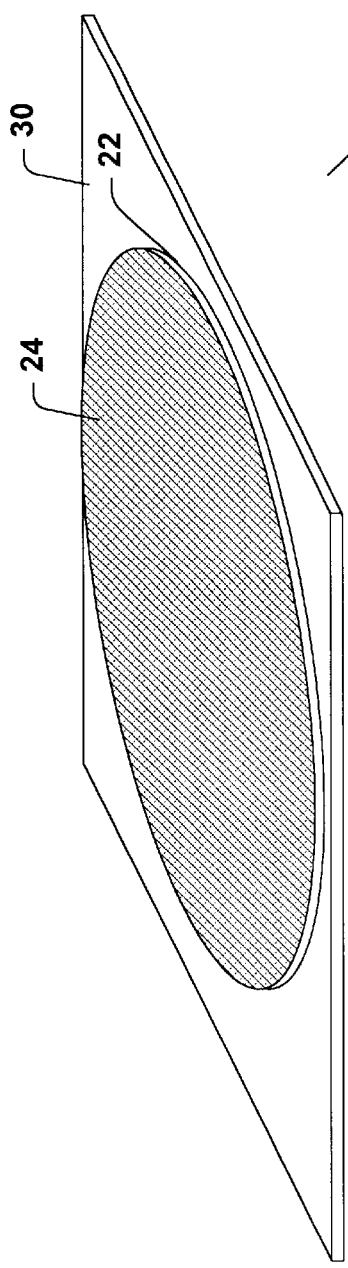
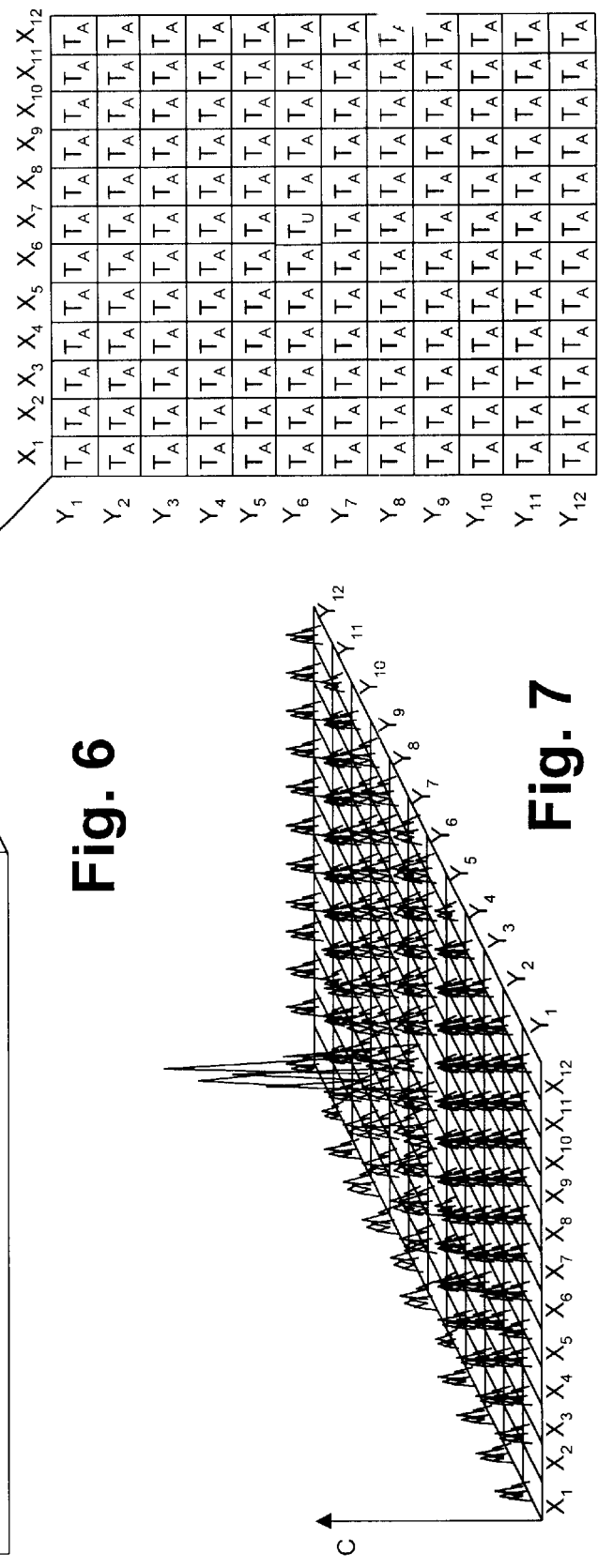
Fig. 6
Fig. 7
Fig. 8

OXIDE/NITRIDE OR OXIDE/NITRIDE/ OXIDE THICKNESS MEASUREMENT USING SCATTEROMETRY

TECHNICAL FIELD

The present invention generally relates to semiconductor processing, and in particular to systems and methods for regulating the formation of dielectric layers in non-volatile semiconductor memory devices.

BACKGROUND OF THE INVENTION

In the semiconductor industry, there is a continuing trend toward higher device densities. To achieve these high densities there have been, and continue to be, efforts towards scaling down device dimensions (e.g., at sub micron levels) on semiconductor wafers. In order to accomplish such high device packing densities, smaller and smaller feature sizes and separations between such features are required. This can include the thickness and spacing of dielectric materials, oxide/nitride (ON) and/or oxide/nitride/oxide (ONO) materials, interconnecting lines, spacing and diameter of contact holes, and the surface geometry such as corners and edges of various features.

The process of manufacturing semiconductors, or integrated circuits (commonly called ICs, or chips), typically consists of more than a hundred steps, during which hundreds of copies of an integrated circuit can be formed on a single wafer. Generally, the process involves creating several layers on and/or in a substrate that ultimately forms the complete integrated circuit. This layering process creates electrically active regions in and/or on the semiconductor wafer surface. Insulation and conductivity between such electrically active regions can be important to reliable operation of such integrated circuits. One type of integrated circuit in which insulation and conductivity between electrically active regions is important is electronic memory.

Electronic memory comes in different forms to serve different purposes. One such electronic memory, FLASH memory, can be employed for information storage in devices including, but not limited to, cellular phones, digital cameras and home video game consoles. FLASH memory can be considered a solid state storage device, in that functionality is achieved electronically rather than mechanically. FLASH memory is a type of EEPROM (Electrically Erasable Programmable Read Only Memory) chip. FLASH memories are a type of non-volatile memory (NVM). NVMs can retain information when power to the NVM is removed which distinguishes NVMs from volatile memories (e.g., DRAM, SRAM) that lose data stored in them when power is removed. FLASH memory is electrically erasable and reprogrammable in-system. The combination of non-volatility and in-system eraseability/reprogrammability make FLASH memory well-suited to a number of end-product applications including, but not limited to, a personal computer BIOS, telecom switches, cellular phones, internetworking devices, instrumentation, automotive devices and consumer-oriented voice, image and data storage devices (e.g., digital cameras, digital voice recorders, PDAs).

An exemplary FLASH memory can have a grid of columns and rows with a cell that has two transistors at each intersection of the rows and columns. Thus, referring initially to Prior Art FIG. 1, a cross section of an exemplary FLASH memory cell 100 is illustrated. The exemplary FLASH memory cell 100 illustrated includes a control gate 102 and a floating gate 106 separated by an ON and/or ONO layer 112. The control gate 102 can be referred to as a "poly 2" while the floating gate 106 can be referred to as a "poly 1", and thus the term interpolydielectric can be applied to the ON and/or ONO layer 112. Properties of the ON and/or ONO layer 112 including, but not limited to, thickness and uniformity, are important to facilitating reliable operation of the memory cell. Furthermore, properties of the ON and/or ONO layer 112 including, but not limited to, thickness and uniformity, are important to facilitating reliable interactions between the control gate 102 and the floating gate 106. Properties of the ON and/or ONO layer 112 are thus important to facilitating reliable operation of the FLASH memory cell 100, due to the insulating and/or conducting property of the ON and/or ONO layer 112. For example, properties including, but not limited to the ability to store data, to retain data, to be erased, to be reprogrammed and to operate in desired electrical and temperature ranges can be affected by the thickness and/or uniformity of the ON and/or ONO layer 112. The control gate 102, floating gate 106 and ON and/or ONO layer 112 can be fabricated on a tunnel oxide layer 108. It is to be appreciated that although the ON and/or ONO layer 112 is illustrated as one layer, that such a layer can be formed from multiple layers (e.g., oxide, nitride, oxide (so called ONO)). It is to be further appreciated that although the FLASH memory cell illustrated in Prior Art FIG. 1 employs an interpolydielectric, that the present invention can be applied to the formation of charge trapping dielectrics in SONOS (Silicon Oxide Nitride Oxide Silicon) type memory devices and MONOS (Metal Oxide Nitride Oxide) devices.

The requirement of small features with close spacing between adjacent features in FLASH memory devices requires sophisticated manufacturing techniques including control of oxide/nitride layer and/or oxide/nitride/oxide layer formation. Fabricating a FLASH memory device using such sophisticated techniques may involve a series of steps including the formation of layers/structures by chemical vapor deposition (CVD) and oxide growth. Conventionally, difficulties in forming, with precise thickness and/or uniformity, an oxide layer over a nitride layer or a polysilicon, have limited the effectiveness and/or properties of FLASH memory devices manufactured by conventional techniques. Similarly, difficulties in forming, with precise thickness and/or uniformity, a nitride layer over an oxide layer have likewise limited the effectiveness of FLASH memory devices manufactured by conventional techniques.

Due to the extremely fine structures that are fabricated on a FLASH memory device, controlling the formation of oxide and/or nitride materials used to separate components (e.g., control gate, floating gate) on a wafer from other components are significant factors in achieving desired critical dimensions and operating properties and thus in manufacturing a reliable FLASH memory device. The more precisely the oxide and/or nitride can be formed the more precisely that critical dimensions may be achieved, with a corresponding increase in FLASH memory reliability. Conventionally, due to non-uniform oxide and/or nitride formation and inaccurate oxide and/or nitride formation monitoring techniques, a thickness of oxide and/or nitride greater or lesser than the thickness desired may be formed.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for a system that facilitates monitoring and controlling ON and/or ONO dielectric formation. An exemplary system may employ one or more light sources arranged to project light on one or more oxide and/or nitride layers on a wafer and one or more light sensing devices (e.g., photo detector, photo diode) for detecting light reflected by the one or more oxide and/or nitride layers. The light, reflected from one or more oxide and/or nitride layers is indicative of at least the oxide and/or nitride thickness, which may vary during the oxide and/or nitride formation process.

One or more oxide/nitride formers can be arranged to correspond to a particular wafer portion. Each oxide/nitride former may be responsible for forming an oxide and/or nitride portion of an ON and/or ONO formation on one or more particular wafer portions. The oxide/nitride formers are selectively driven by the system to form an oxide and/or nitride portion of the ON and/or ONO dielectric at a desired thickness and/or desired uniformity. The progress of the oxide and/or nitride formation is monitored by the system by comparing the thickness and/or uniformity of the oxide and/or nitride portions of the ON and/or ONO dielectric on the wafer to a desired thickness and/or uniformity. Different wafers and even different components within a wafer may benefit from varying oxide and/or nitride thickness and/or uniformity. By monitoring the oxide and/or nitride thickness and/or uniformity at the one or more wafer portions, the present invention enables selective control of oxide and/or nitride formation. As a result, more optimal ON and/or ONO dielectric formation is achieved, which in turn improves FLASH memory manufacturing.

One particular aspect of the invention relates to a system for regulating oxide and/or nitride formation. At least one oxide/nitride former forms an oxide and/or nitride portion of the ON and/or ONO dielectric on a portion of a wafer, and an oxide and/or nitride former driver system drives the at least one oxide/nitride former. A system for directing light directs light to one or more oxide and/or nitride layers being formed on the wafer, and a measuring system measures parameters of the one or more oxide and/or nitride layers based on light reflected by the layers. A processor is operatively coupled to the measuring system and the oxide and/or nitride former driving system, the processor receives oxide and/or nitride formation parameter data from the measuring system and the processor uses the data to at least partially base control of the at least one oxide/nitride former so as to regulate oxide and/or nitride formation of the at least one portion of the wafer where oxide and/or nitride is being formed.

Yet another aspect of the present invention relates to a method for regulating oxide and/or nitride formation. The method includes defining a wafer as a plurality of portions; forming one or more oxide and/or nitride layers on a wafer, directing light onto at least one of the oxide and/or nitride layer; collecting light reflected by the at least one oxide and/or nitride layer; analyzing the reflected light to determine the progress of oxide and/or nitride formation on the wafer; and controlling an oxide/nitride former to regulate the formation of the oxide and/or nitride layer on the at least one portion.

Still another aspect of the present invention relates to a method for regulating oxide and/or nitride formation. The method includes: partitioning a wafer into a plurality of grid blocks; forming one or more oxide and/or nitride layers on a wafer using one or more oxide/nitride formers, each oxide/nitride former functionally corresponding to a respective grid block; determining the progress of the oxide and/or nitride formation on portions of the wafer, each portion corresponding to a respective grid block; and using a processor to coordinate control of the oxide/nitride formers, respectively, in accordance with determined oxide and/or nitride thickness and/or uniformity of the respective portions of the wafer.

Another aspect of the present invention relates to a system for regulating ON and/or ONO dielectric formation. The system includes: means for sensing oxide and/or nitride thickness and/or uniformity of a plurality of portions of a wafer; means for forming oxide and/or nitride layers on the respective wafer portions; and means for selectively controlling the means for forming oxide and/or nitride layers so as to regulate oxide and/or nitride thickness and/or uniformity on the respective wafer portions.

To the accomplishment of the foregoing and related ends, the invention, then, comprises the features hereinafter fully described and particularly pointed out in the claims. The following description and the annexed drawings set forth in detail certain illustrative aspects of the invention. These aspects are indicative, however of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

Prior Art

FIG. 6 is a perspective illustration of a substrate having an oxide and/or nitride layer deposited thereon in accordance with the present invention.

FIG. 7 is a representative three-dimensional grid map of oxide and/or nitride layer formations illustrating oxide and/or nitride layer thickness and/or uniformity measurements taken at grid blocks of the grid map in accordance with the present invention.

FIG. 8 is an oxide and/or nitride layer thickness and/or uniformity measurement table correlating the oxide and/or nitride thickness and/or uniformity measurements of FIG. 7 with desired values for the thickness and/or uniformity measurements in accordance with the present invention.

DETAILED DESCRIPTION OF THE INVENTION

Figure 1:
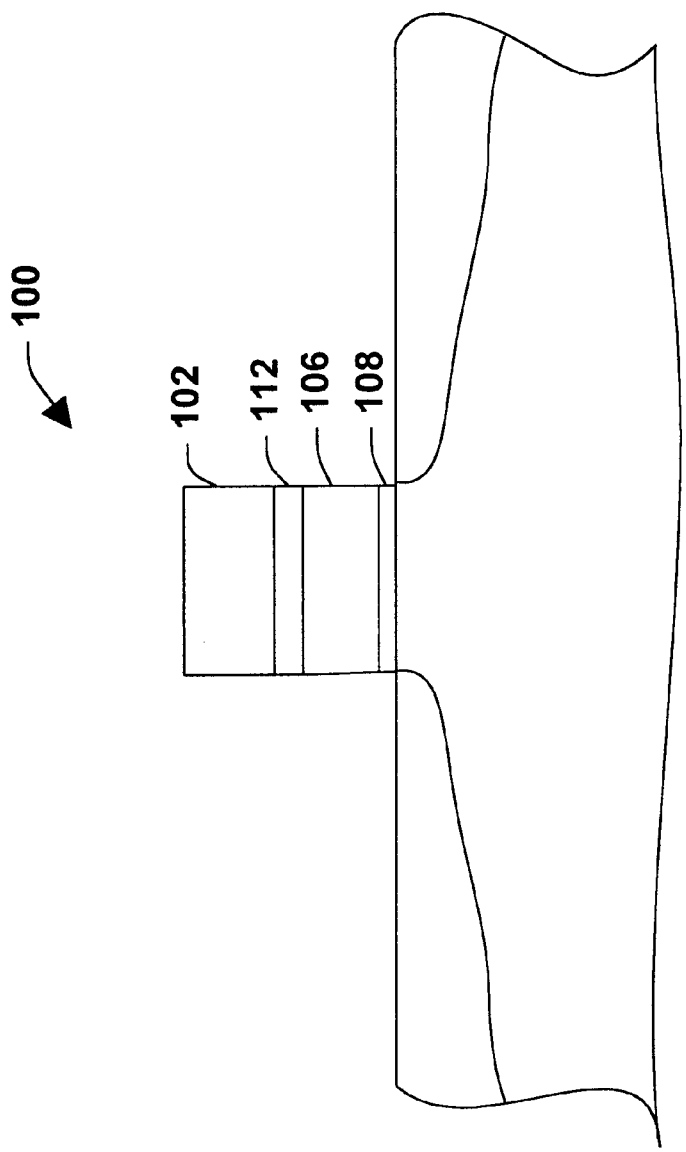
FIG. 1 is a cross section of an exemplary FLASH memory cell.

The present invention will now be described with reference to the drawings, wherein like reference numerals are used to refer to like elements throughout. The present invention will be described with reference to a system for controlling oxide and/or nitride formation using one or more oxide/nitride formers and a scatterometry system. It should be understood that the description of these exemplary aspects are merely illustrative and that they should not be taken in a limiting sense.

It is to be appreciated that various aspects of the present invention may employ technologies associated with facilitating unconstrained optimization and/or minimization of error costs. Thus, non-linear training systems/methodologies (e.g., back propagation, Bayesian, fuzzy sets, non-linear regression, or other neural networking paradigms including mixture of experts, cerebella model arithmetic computer (CMACS), radial basis functions, directed search networks and function link networks may be employed.

Figure 2:
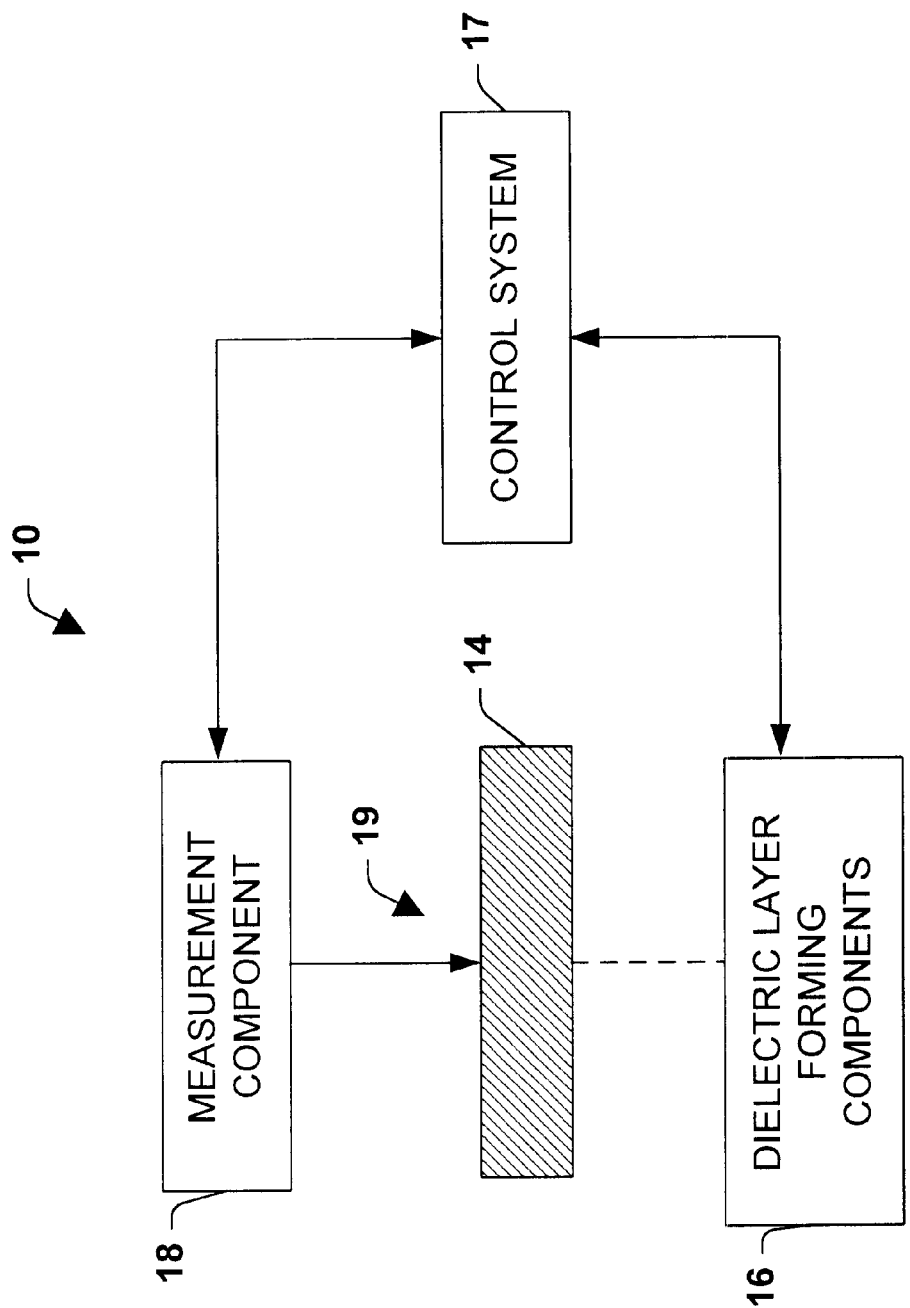
FIG. 2 is a partial schematic block diagram of an ON and/or ONO dielectric formation monitoring system in accordance with the present invention.

Referring now to FIG. 2, a system 10 for controlling ON and/or ONO dielectric formation on a wafer 14 is shown. One or more ON and/or ONO formations may be formed on the wafer 14. It is to be appreciated that an ON and/or ONO formation can include one or more layers including, but not limited to, oxide and nitride layers. The system 10 includes dielectric layer forming components 16 operable to form a dielectric layer on the wafer 14. The system 10 further includes a measurement component 18 operable to measure, in situ, the developing thickness of the oxide and/or nitride layers being formed on the wafer 14 by the dielectric layer forming components 16. The measurement component 18 can direct a light 19 at the wafer 14 and receive light reflected and/or refracted back from the wafer 14. Such reflected and/or refracted light can be analyzed by the measurement component 18, with the results of such analysis passed to a control system 17. The control system 17 can thus be employed to feed forward control information to the dielectric layer forming components 16, facilitating more precise control of the dielectric layer formed on the wafer 14.

Figure 3:
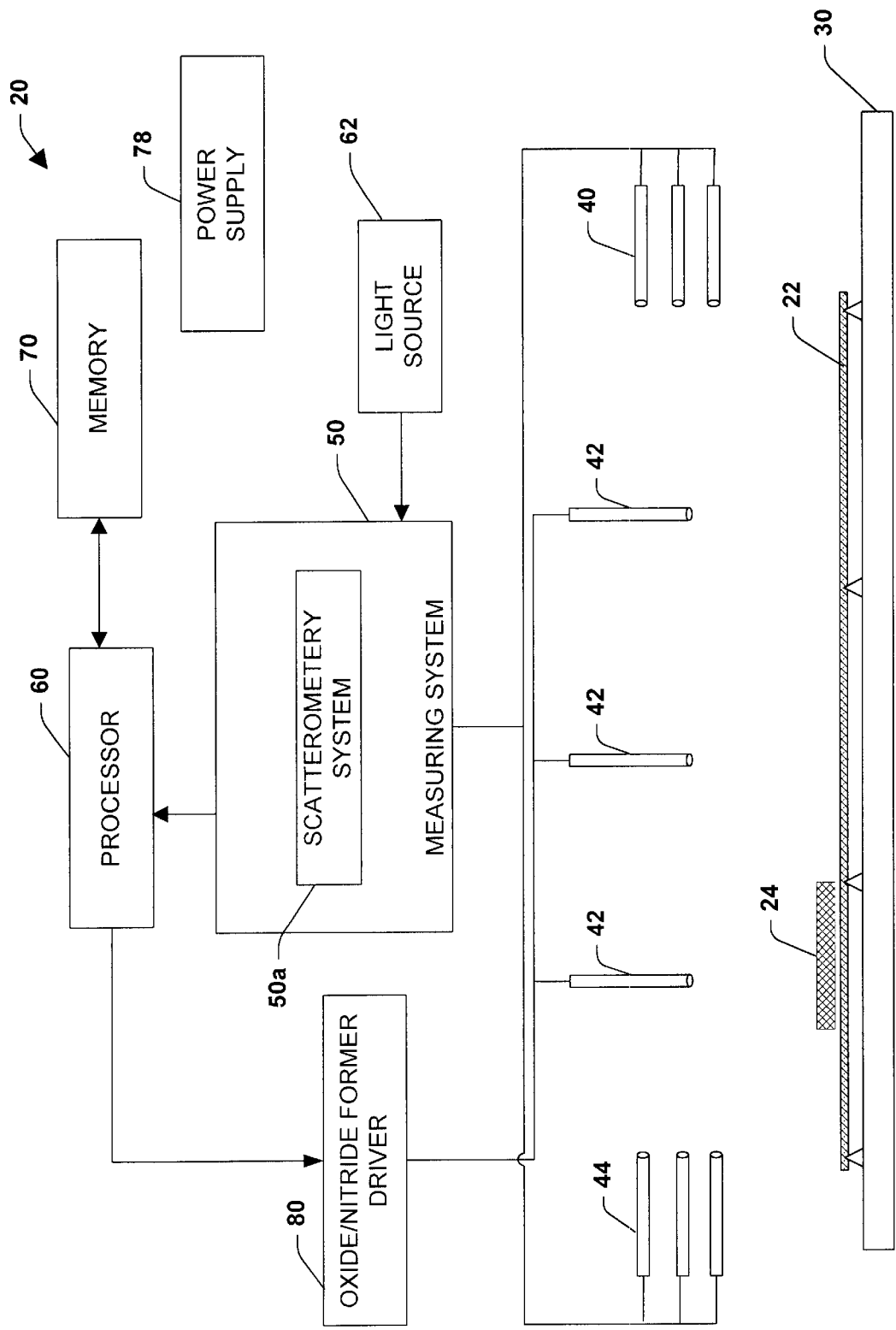
FIG. 3 is schematic block diagram of an ON and/or ONO dielectric formation monitoring system in accordance with the present invention.

Referring now to FIG. 3, a system 20 for controlling ON and/or ONO dielectric formation on a wafer 22 is shown. One or more ON and/or ONO formations 24 may be formed on the wafer 22. It is to be appreciated by one skilled in the art that an ON and/or ONO formation 24 can include one or more layers including, but not limited to, oxide and nitride layers. It is to be further appreciated that such oxide and nitride layers can be formed employing techniques including, but not limited to chemical vapor deposition and oxide growth.

The system 20 further includes one or more oxide/nitride formers 42 that are selectively controlled by the system 20 so as to facilitate controlled formation of oxide and/or nitride layers on the wafer 22. One or more light sources 44 project light onto respective portions of the wafer 22. A portion may have one or more ON and/or ONO formations 24 being formed on that portion. Light reflected by the one or more ON and/or ONO formations 24 is collected by one or more light collecting devices 40 and is processed by an ON and/or ONO formation parameter measuring system 50 to measure at least one parameter relating to the thickness and/or uniformity of the one or more ON and/or ONO formations 24. The reflected light is processed with respect to the incident light in measuring the various parameters.

The measuring system 50 includes a scatterometry system 50a. It is to be appreciated that any suitable scatterometry system may be employed to carry out the present invention and such systems are intended to fall within the scope of the claims. A source of light 62 such as a laser, for example, provides light to the one or more light sources 44 via the measuring system 50. Preferably, the light source 62 is a frequency-stabilized laser, however, it will be appreciated that any laser or other light source (e.g., laser diode or helium neon (HeNe) gas laser) suitable for carrying out the present invention can be employed.

A processor 60 receives the measured data from the measuring system 50 and determines the thickness and/or uniformity of respective ON and/or ONO formations 24 on the portions of the wafer 22. The processor 60 is operatively coupled to system 50 and is programmed to control and operate the various components within the oxide and/or nitride monitoring and controlling system 20 in order to carry out the various functions described herein. The processor, or CPU 60, may be any of a plurality of processors. The manner in which the processor 60 can be programmed to carry out the functions relating to the present invention will be readily apparent to those having ordinary skill in the art based on the description provided herein. A memory 70, which is operatively coupled to the processor 60, is also included in the system 20 and serves to store program code executed by the processor 60 for carrying out operating functions of the system 20 as described herein. The memory 70 also serves as a storage medium for temporarily storing information such as oxide and/or nitride layer thickness, oxide and/or nitride layer thickness tables, oxide and/or nitride layer uniformity, oxide and/or nitride layer tables, wafer coordinate tables, scatterometry information, and other data that may be employed in carrying out the present invention. A power supply 78 provides operating power to the system 20. Any suitable power supply (e.g., battery, line power) may be employed to carry out the present invention.

The processor 60 is also coupled to an oxide/nitride former driving system 80 that drives the oxide/nitride formers 42. The oxide/nitride former driving system 80 is controlled by the processor 60 so as to selectively vary output of the respective oxide/nitride formers 42 and thus facilitates providing more precise control of the thickness of the oxide and/or nitride layers. Each respective portion of the wafer 22 may have a corresponding oxide/nitride former 42 associated therewith. The processor 60 is able to monitor the development of the various ON and/or ONO formations 24 and selectively regulate the thickness and/or uniformity of each portion via the corresponding oxide/nitride formers 42. As a result, the system 20 provides for regulating ON and/or ONO formation 24 thickness and/or uniformity on the wafer 22, which in turn improves, for example, reliability of FLASH memory devices manufactured employing the present invention. Although a processing chamber is not shown, the wafer 22, the ON and/or ONO formations 24, the chuck 30, the light sources 44, the light collecting devices 40 and the oxide/nitride formers 42 may be positioned within a processing chamber wherein certain parameters (e.g. temperature, pressure, atmosphere composition and the like) can be controlled.

Figure 4:
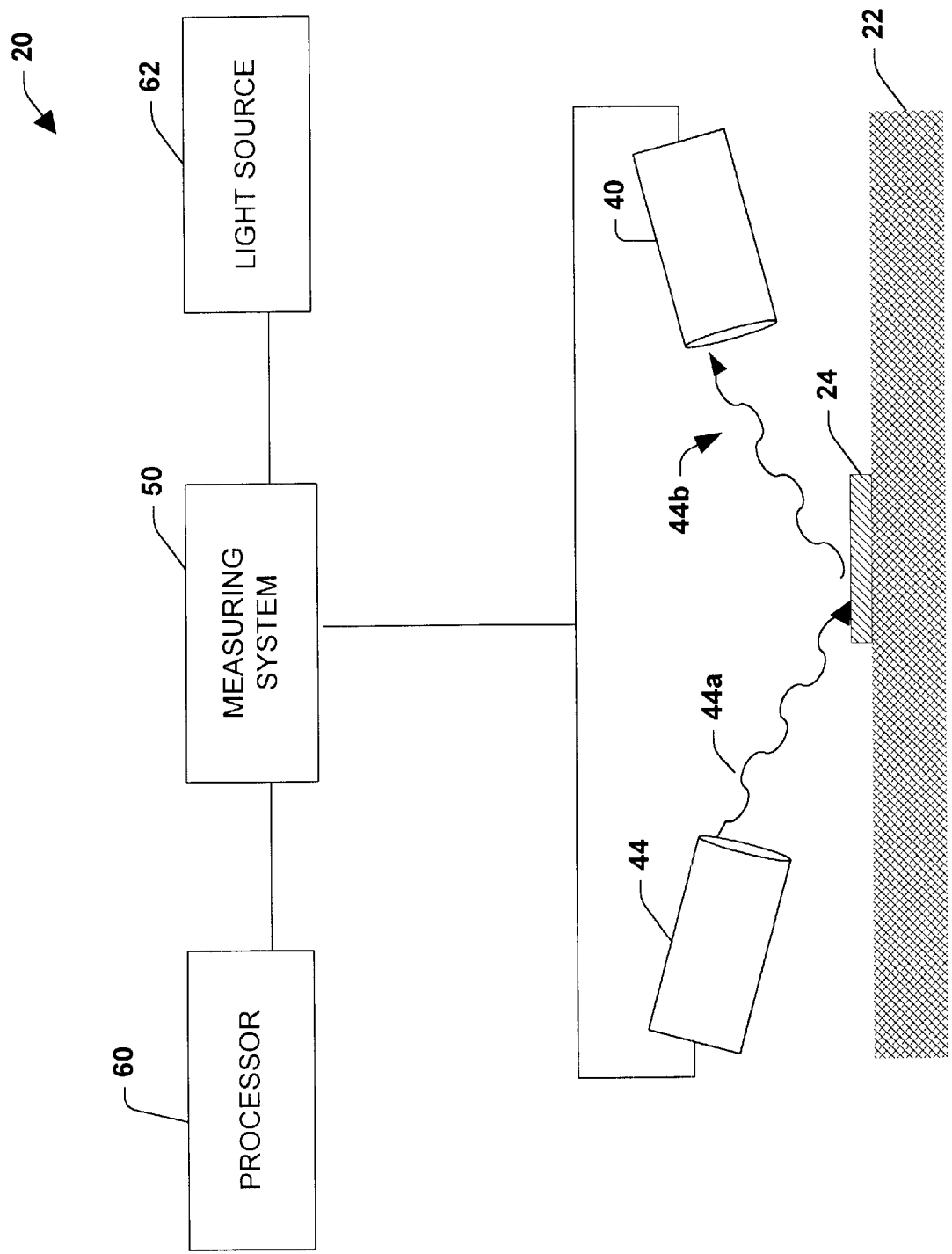
FIG. 4 is a partial schematic block diagram of the system of FIG. 3 being employed in connection with determining the thickness and/or uniformity of oxide and/or nitride layers in accordance with the present invention.

FIG. 4 illustrates the system 20 being employed to measure the thickness and/or uniformity of ON and/or ONO formations 24 on a wafer 22 at a particular location on the wafer. The light source 44 directs a light 44a incident to the surface of the wafer 22, and the angle of a reflected and/or refracted light 44b from the surface of the wafer 22 will vary in accordance with the thickness and/or uniformity of the ON and/or ONO formation 24. The measuring system 50 collects the light 44b and processes the light 44b in accordance with scatterometry techniques to provide the processor 60 with data corresponding to the thickness and/or uniformity of the ON and/or ONO formation 24.

Figure 5:
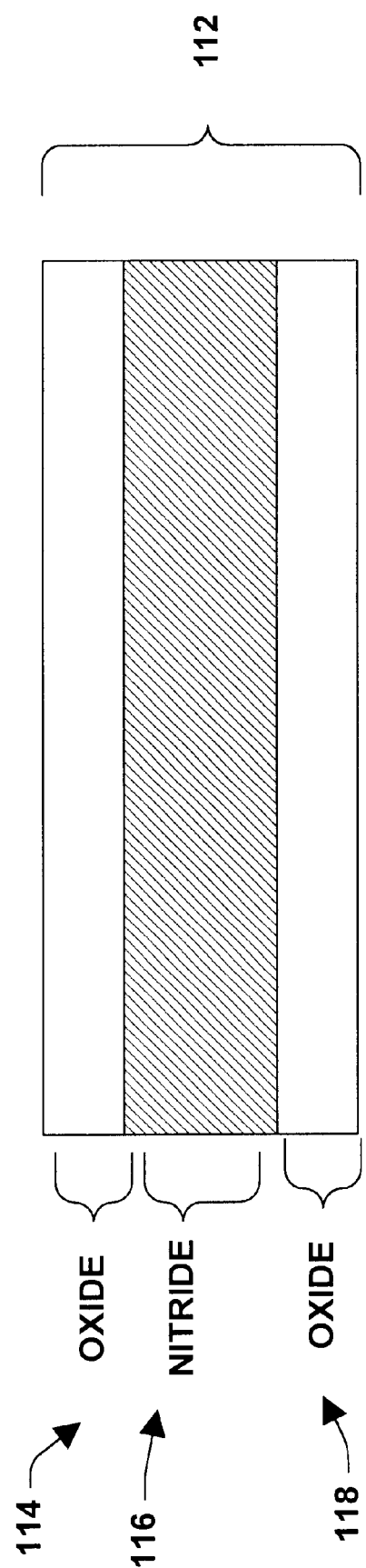
FIG. 5 illustrates an ONO dielectric.

FIG. 5 illustrates a dielectric layer 112 formed of three layers, an oxide layer 114, a nitride layer 116, and an oxide layer 118. Precisely controlling the thickness and/or uniformity of each of the three layers 114, 116 and 118 leads to improvements in the reliability of a FLASH memory cell. Thus, the present invention facilitates controlling the thickness and/or uniformity of each of the layers 114, 116, and 118 individually, and/or facilitates controlling the overall thickness and/or uniformity of the ON and/or ONO dielectric layer 112. For example, the present invention can facilitate controlling the thickness and/or uniformity of the oxide layer 118 by collecting scatterometry data associated with the oxide layer 118 during formation. Data collected during the formation of the oxide layer 118 can thus be analyzed and employed to produce information that can be fed back to control the formation process. For example, if the oxide layer 118 is being formed by thermal oxidation, the analyzed scatterometry data can be employed to generate feedback information operable to control the time over which the oxide growth should continue and/or the temperature at which the continued oxide growth should occur. If the oxide layers 118 and 114 and the nitride layer 116 can be formed by a CVD technique, the analyzed scatterometry data can be employed to generate feedback information operable to control deposition temperature, rates of gas flows, pressures, etc. If the top oxide 114 is formed by partial thermal oxidation of the nitride either by dry ($O_2$) or steam ($H_2O$) oxidation, then the analyzed scatterometry data can be employed to generate feedback information operable to control oxidation temperature, $O_2$ and/or $H_2O$ gas flow rates, pressures, etc.

Turning now to FIGS. 6–8 the chuck 30 is shown in perspective supporting the wafer 22 whereupon one or more ON and/or ONO formations 24 may be formed. The wafer 22 can be divided into a grid pattern as that shown in FIG. 7. Each grid block (XY) of the grid pattern corresponds to a particular portion of the wafer 22 and each grid block may have one or more ON and/or ONO formations 24 associated with that grid block. Each portion is individually monitored for oxide and/or nitride thickness and/or uniformity and each portion is individually controlled for oxide and/or nitride formation.

In FIG. 7, each ON and/or ONO formation 24 in each respective portion of the developer ($X_1Y_1 \ldots X_{12}, Y_{12}$) is being monitored for thickness and/or uniformity using reflective light, the measuring system 50 and the processor 60. The thickness of each ON and/or ONO formation 24 is shown. As can be seen, the thickness at coordinate $X_7Y_6$ is substantially higher than the thickness of the other wafer 22 portions XY. It is to be appreciated that although FIG. 7 illustrates the wafer 22 being mapped (partitioned) into 144 grid block portions, the wafer 22 may be mapped with any suitable number of portions and any suitable number of ON and/or ONO formations 24 can be monitored. Although the present invention is described with respect to one oxide/nitride former 42 corresponding to one grid block XY, it is to be appreciated that any suitable number of oxide/nitride formers 42 corresponding to any suitable number of grid blocks may be employed. It is to be further appreciated that although FIG. 7 illustrates measurements for oxide and/or nitride formation thickness measurements for uniformity may also be taken.

FIG. 8 is a representative table of thickness measurements (taken for the various grid blocks) that have been correlated with acceptable thickness values for the portions of the wafer 22 mapped by the respective grid blocks. As can be seen, all the grid blocks, except grid block $X_7Y_6$, have thickness measurements corresponding to an acceptable thickness value ($T_A$) (e.g., are within an expected range of thickness measurements), while grid block $X_7Y_6$ has an undesired thickness value ($T_U$). Thus, the processor 60 has determined that an undesirable thickness condition exists at the portion of the wafer 22 mapped by grid block $X_7Y_6$. Accordingly, the processor 60 can drive the oxide/nitride former $42_{7,6}$, which corresponds to the portion of the wafer 22 mapped at grid block $X_7Y_6$, to bring the oxide and/or nitride thickness of this portion of the wafer 22 to an acceptable level. It is to be appreciated that the oxide/nitride formers 42 may be driven so as to maintain, increase and/or decrease the rate of oxide and/or nitride formation of the respective wafer 22 portions as desired. It is to be appreciated that although FIG. 8 illustrates measurements for oxide and/or nitride formation thickness, that measurements for uniformity may also be taken.

Scatterometry is a technique for extracting information about a surface upon which an incident light has been directed. Information concerning properties including, but not limited to, dishing, erosion, profile, thickness of thin films and critical dimensions of features present on the surface can be extracted. The information can be extracted by comparing the phase and/or intensity of the light directed onto the surface with phase and/or intensity signals of a complex reflected and/or diffracted light resulting from the incident light reflecting from and/or diffracting through the surface upon which the incident light was directed. The intensity and/or the phase of the reflected and/or diffracted light will change based on properties of the surface upon which the light is directed. Such properties include, but are not limited to, the chemical properties of the surface, the planarity of the surface, features on the surface, voids in the surface, and the number and/or type of layers beneath the surface.

Different combinations of the above-mentioned properties will have different effects on the phase and/or intensity of the incident light resulting in substantially unique intensity/phase signatures in the complex reflected and/or diffracted light. Thus, by examining a signal (signature) library of intensity/phase signatures, a determination can be made concerning the properties of the surface. Such substantially unique phase/intensity signatures are produced by light reflected from and/or refracted by different surfaces due, at least in part, to the complex index of refraction of the surface onto which the light is directed. The complex index of refraction (N) can be computed by examining the index of refraction (n) of the surface and an extinction coefficient (k). One such computation of the complex index of refraction can be described by the equation:

$$N=n-jk$$

where j is an imaginary number.

The signal (signature) library can be constructed from observed intensity/phase signatures and/or signatures generated by modeling and simulation. By way of illustration, when exposed to a first incident light of known intensity, wavelength and phase, a first feature on a wafer can generate a first phase/intensity signature. Similarly, when exposed to the first incident light of known intensity, wavelength and phase, a second feature on a wafer can generate a second phase/intensity signature. For example, a line of a first width may generate a first signature while a line of a second width may generate a second signature. Observed signatures can be combined with simulated and modeled signatures to form the signal (signature) library. Simulation and modeling can be employed to produce signatures against which measured phase/intensity signatures can be matched. In one exemplary aspect of the present invention, simulation, modeling and observed signatures are stored in a signal (signature) library containing over three hundred thousand phase/intensity signatures. Thus, when the phase/intensity signals are received from scatterometry detecting components, the phase/intensity signals can be pattern matched, for example, to the library of signals to determine whether the signals correspond to a stored signature.

Figure 9:
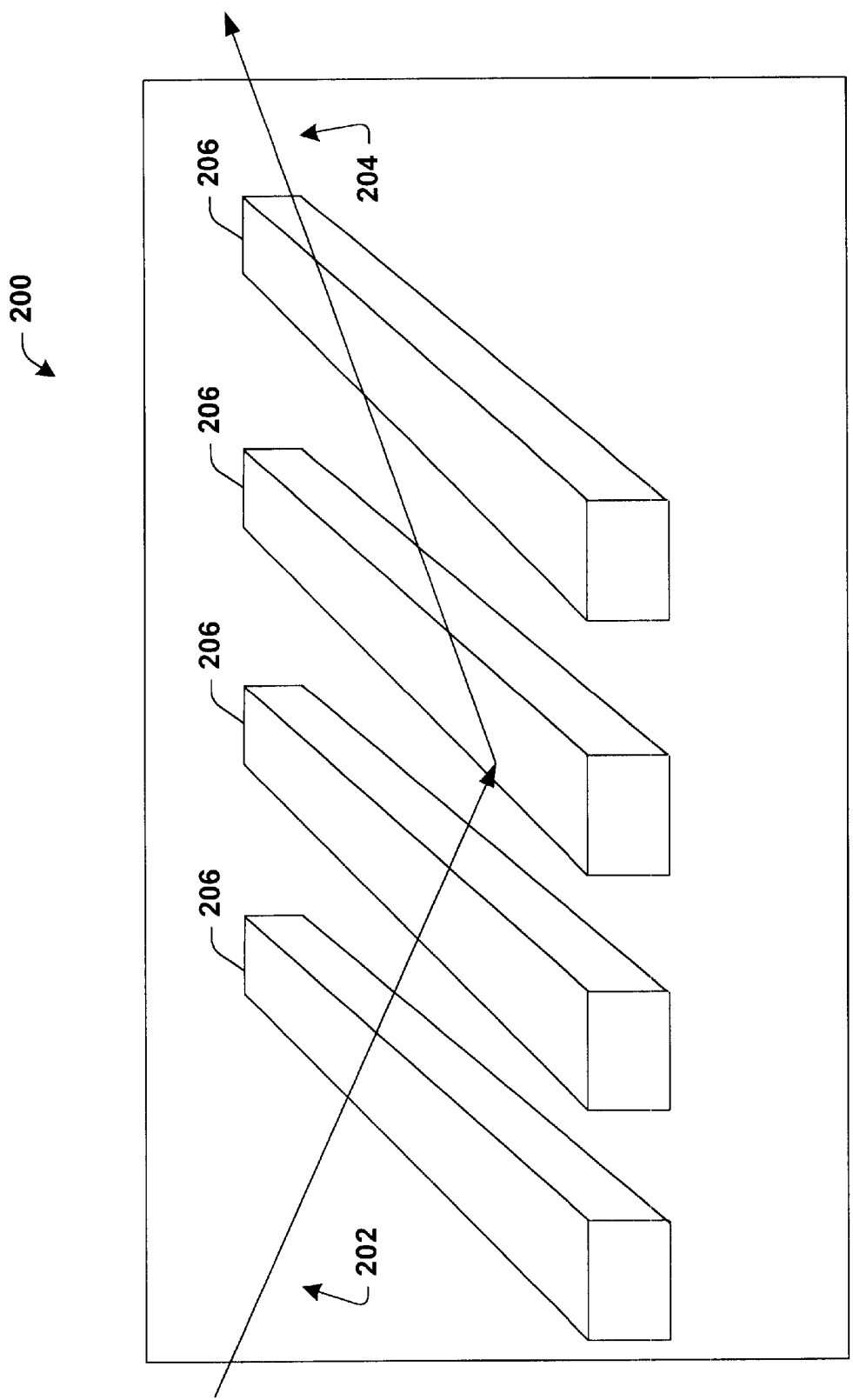
FIG. 9 is a simplified perspective view of an incident light reflecting off a surface, in accordance with an aspect of the present invention.
Figure 14:
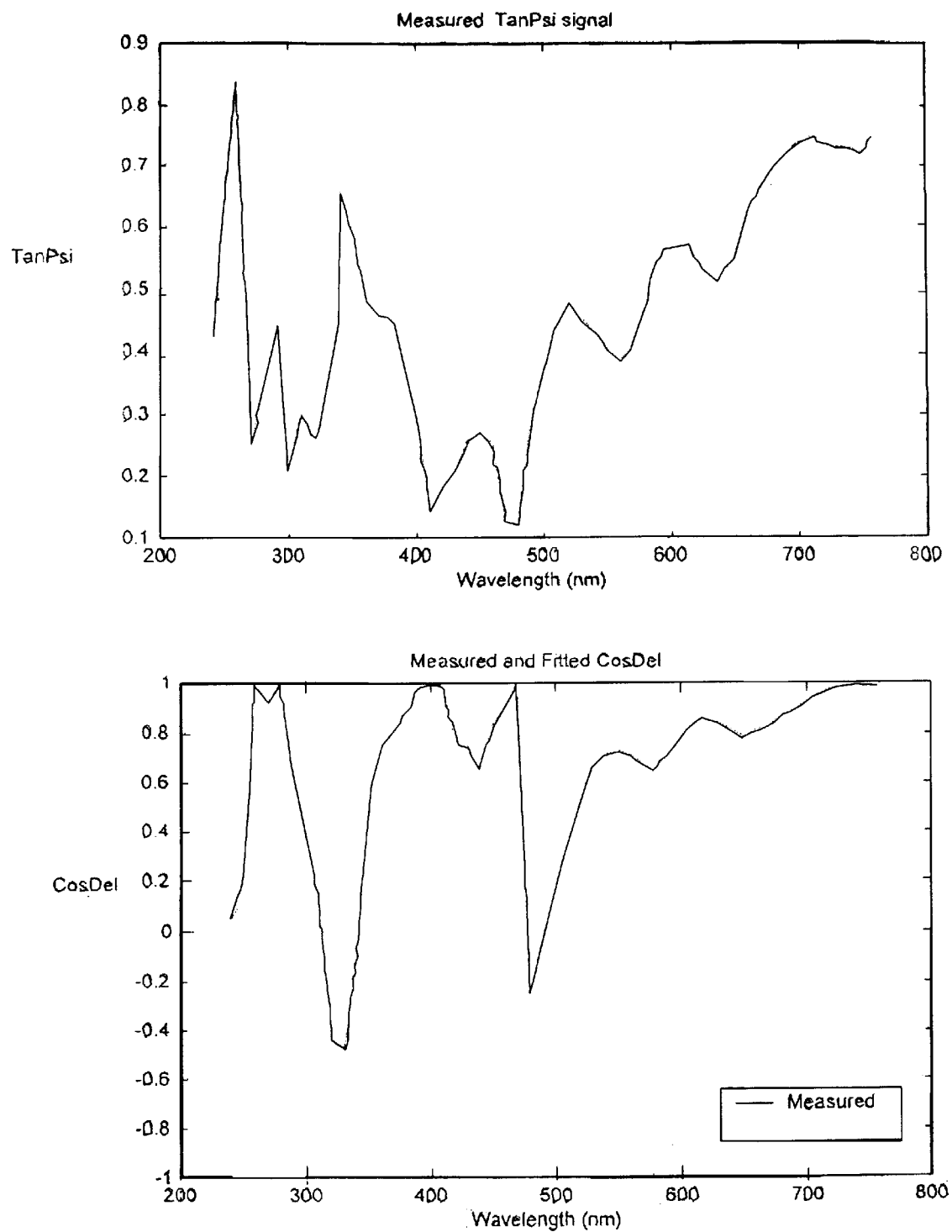
FIG. 14 illustrates phase and intensity signals recorded from a complex reflected and refracted light produced when an incident light is directed onto a surface, in accordance with an aspect of the present invention.

To illustrate the principles described above, reference is now made to FIGS. 9 through 14. Referring initially to FIG. 9, an incident light 202 is directed at a surface 200, upon which one or more features 206 may exist. In FIG. 9 the incident light 202 is reflected as reflected light 204. The properties of the surface 200, including but not limited to, thickness, uniformity, planarity, chemical composition and the presence of features, can affect the reflected light 204. In FIG. 9, the features 206 are raised upon the surface 200. The phase and intensity of the reflected light 204 can be measured and plotted, as shown, for example, in FIG. 14. The phase 260 of the reflected light 204 can be plotted, as can the intensity 262 of the reflected light 204. Such plots can be employed to compare measured signals with signatures stored in a signature library using techniques like pattern matching, for example. Although the features 206 are illustrated as substantially regular, it is to be appreciated that irregular features can also be measured using scatterometry techniques.

Figure 10:
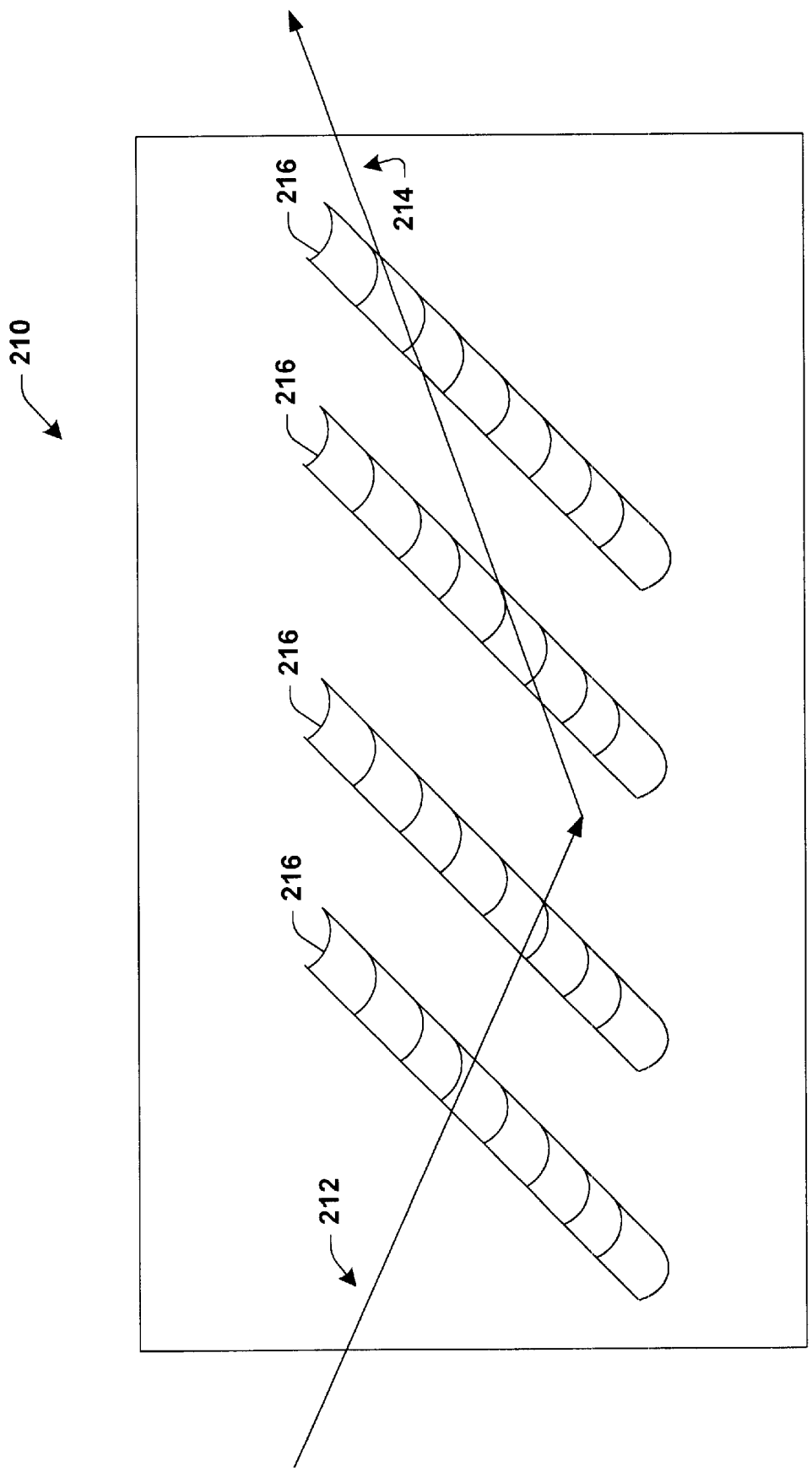
FIG. 10 is a simplified perspective view of an incident light reflecting off a surface, in accordance with an aspect of the present invention.

Referring now to FIG. 10, an incident light 212 is directed onto a surface 210 upon which one or more depressions 216 appear. The incident light 212 is reflected as reflected light 214. Like the one or more features 206 (FIG. 9) may affect an incident beam, so too may the one or more depressions 216 affect an incident beam. Thus, it is to be appreciated that scatterometry can be employed to measure features appearing on a surface, features appearing in a surface, and properties of a surface itself, regardless of features. It is to be further appreciated that the term "features" includes features intentionally and unintentionally appearing on a surface.

Figure 11:
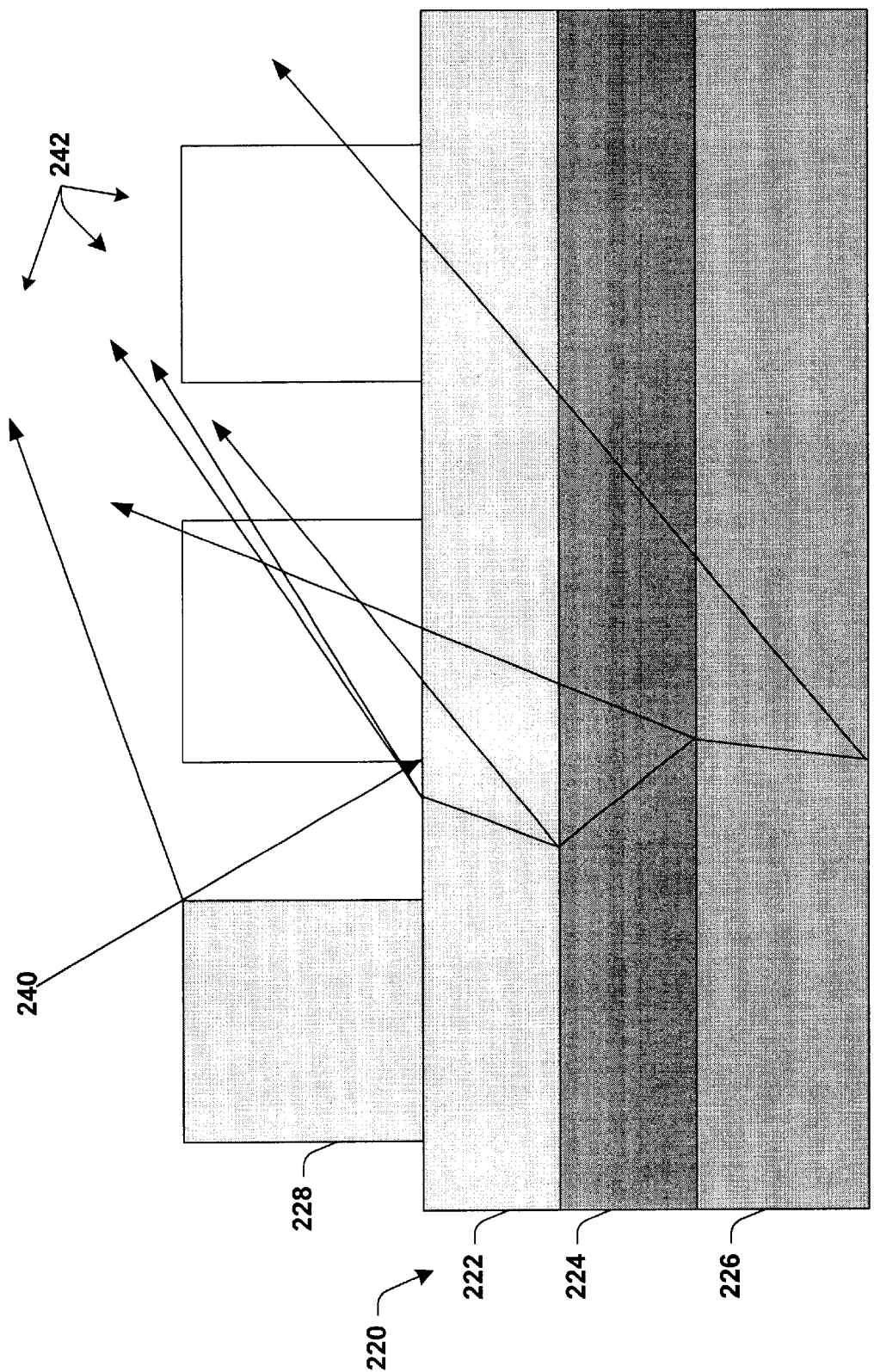
FIG. 11 illustrates a complex reflected and refracted light produced when an incident light is directed onto a surface, in accordance with an aspect of the present invention.

Turning now to FIG. 11, complex reflections and refractions of an incident light 240 are illustrated. The reflection and refraction of the incident light 240 can be affected by factors including, but not limited to, the presence of one or more features 228, and the composition of the substrate 220 upon which the features 228 reside. For example, properties of the substrate 220 including, but not limited to the thickness of a layer 222, the chemical properties of the layer 222, the opacity and/or reflectivity of the layer 222, the thickness of a layer 224, the chemical properties of the layer 224, the opacity and/or reflectivity of the layer 224, the thickness of a layer 226, the chemical properties of the layer 226, and the opacity and/or reflectivity of the layer 226 can affect the reflection and/or refraction of the incident light 240. Thus, a complex reflected and/or refracted light 242 may result from the incident light 240 interacting with the features 228, and/or the layers 222, 224 and 226. Although three layers 222, 224 and 226 are illustrated in FIG. 11, it is to be appreciated by one skilled in the art that a dielectric can be formed of a greater or lesser number of such layers.

Figure 12:
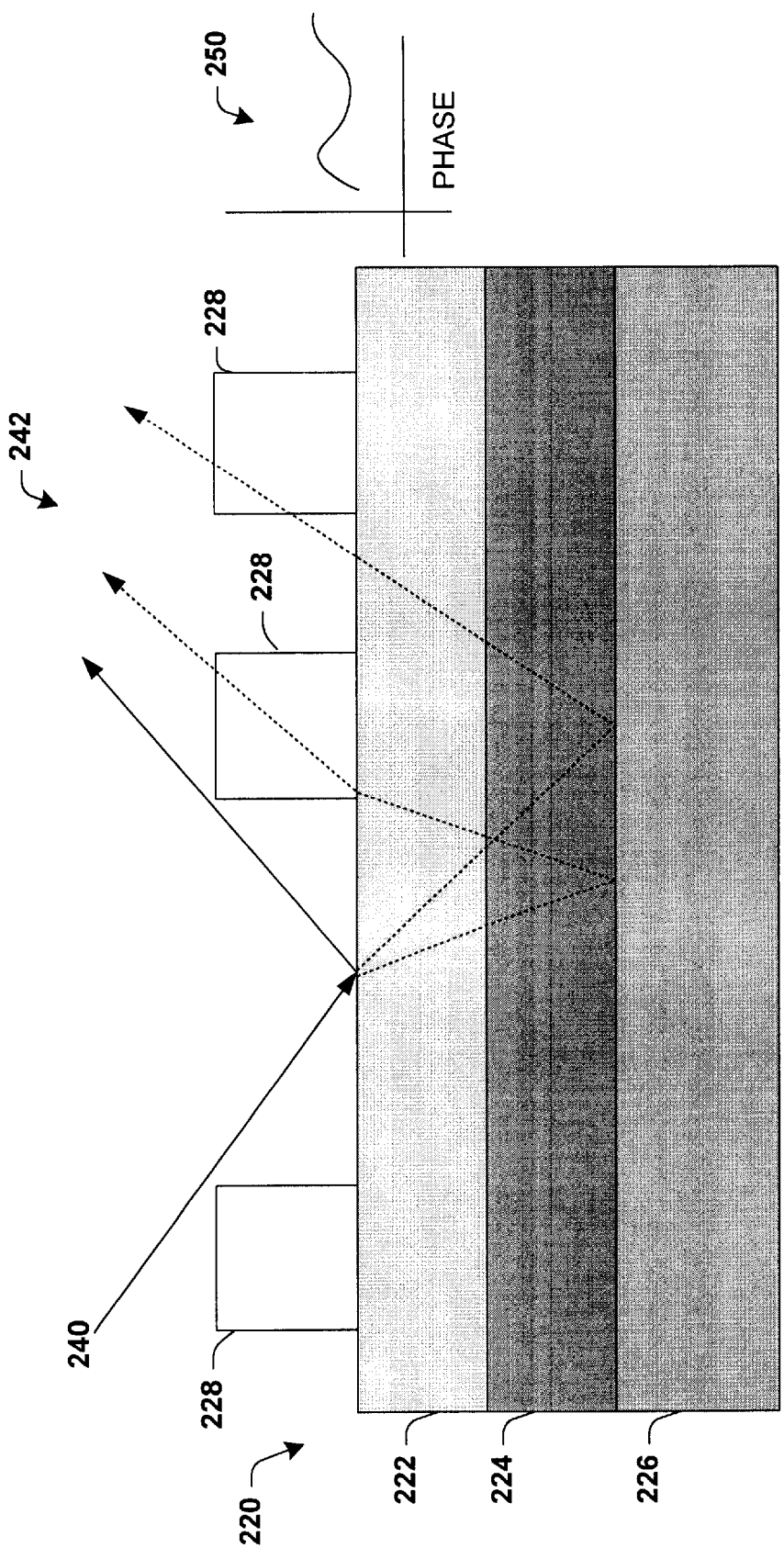
FIG. 12 illustrates a complex reflected and refracted light produced when an incident light is directed onto a surface, in accordance with an aspect of the present invention.
Figure 13:
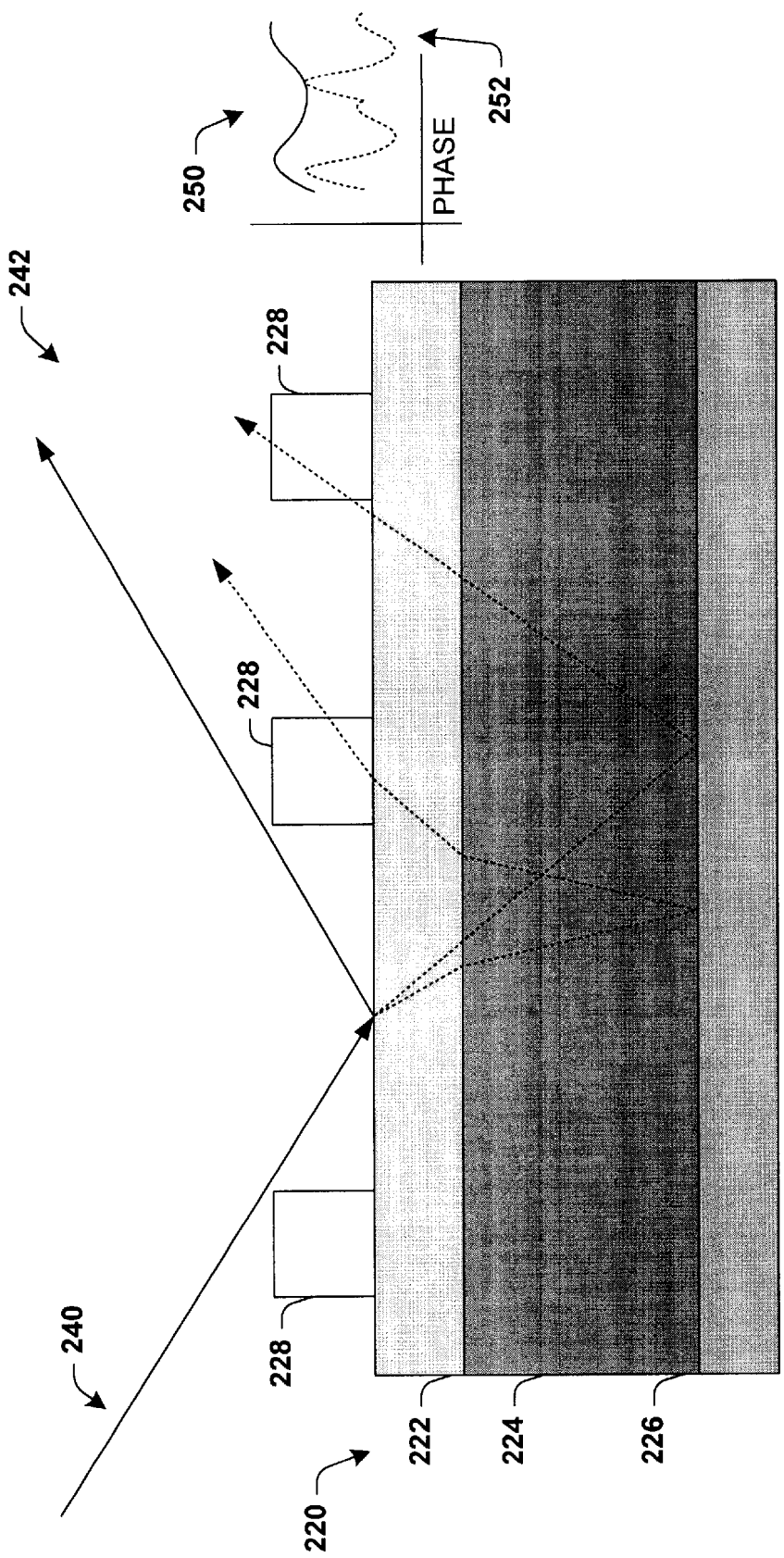
FIG. 13 illustrates a complex reflected and refracted light produced when an incident light is directed onto a surface, in accordance with an aspect of the present invention.

Turning now to FIG. 12, one of the properties from FIG. 11 is illustrated in greater detail. The dielectric 220 can be formed of one or more layers 222, 224 and 226. For example, layer 222 may be an oxide layer, layer 224 may be a nitride layer, and layer 226 may be an oxide layer. The phase 250 of the reflected and/or refracted light 242 can depend, at least in part, on the thickness of a layer, for example, the layer 224. Thus, in FIG. 13, the phase 252 of the reflected light 242 differs from the phase 250 due, at least in part, to the different thickness of the layer 224 in FIG. 13. Although the phase is measured and plotted in association with FIGS. 12 and 13, changes to intensity may also be measured and plotted in accordance with the present invention.

Thus, scatterometry is a technique that can be employed to extract information about a surface upon which an incident light has been directed. The information can be extracted by analyzing phase and/or intensity signals of a complex reflected and/or diffracted light. The intensity and/or the phase of the reflected and/or diffracted light will change based on properties of the surface upon which the light is directed, resulting in substantially unique signatures that can be analyzed to determine one or more properties of the surface upon which the incident light was directed.

Figure 15:
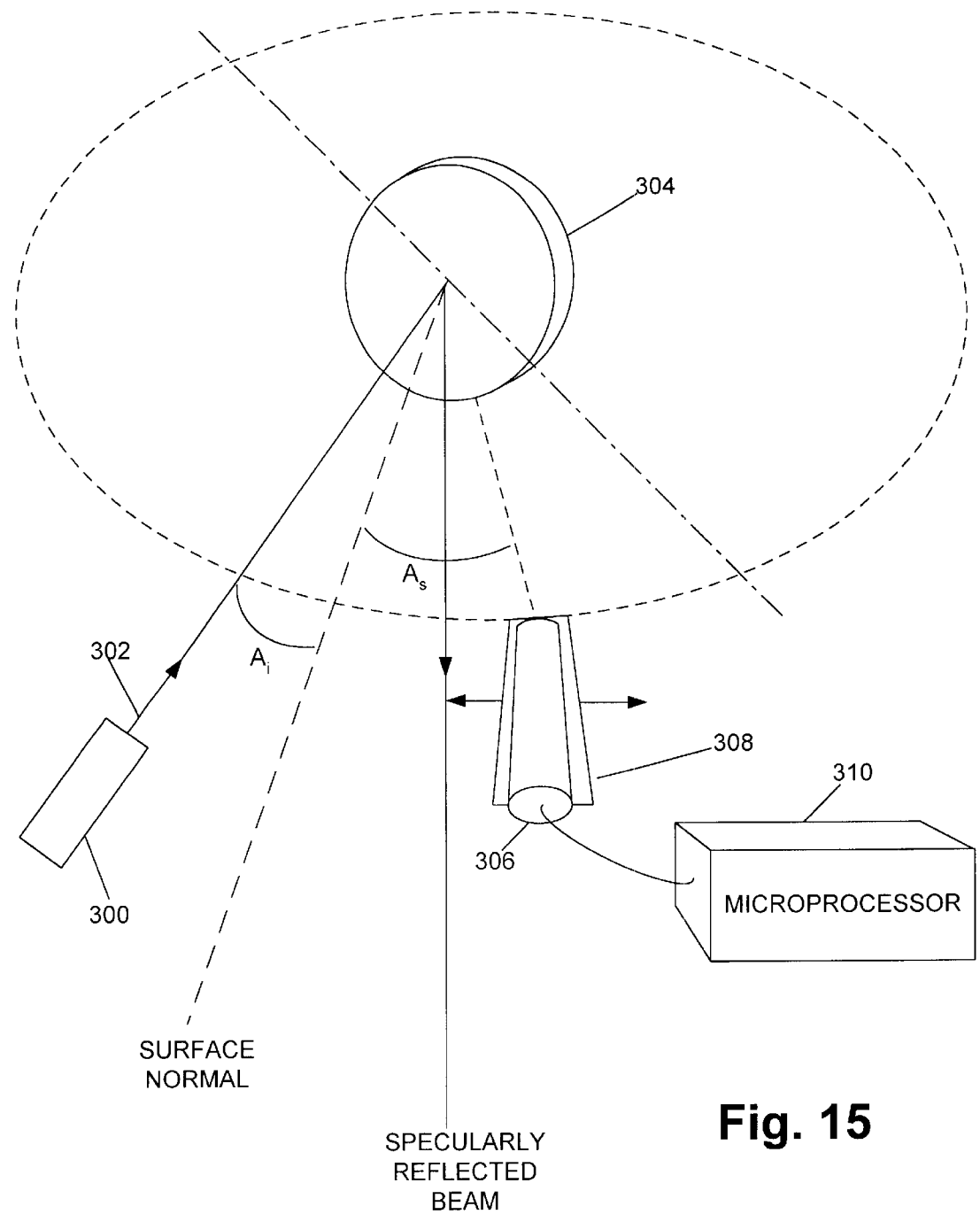
FIG. 15 is an example scatterometry system collecting reflected light in accordance with an aspect of the present invention.

FIG. 15 illustrates an exemplary scatterometry system collecting reflected light. Light from a laser 300 is brought to focus in any suitable well-known manner to form a beam 302. A sample, such as a wafer 304 is placed in the path of the beam 302 and a photo detector or photo multiplier 306 of any suitable well-known construction. Different detector methods may be employed to determine the scattered power. To obtain a grating pitch, the photo detector or photo multiplier 306 may be mounted on a rotation stage 308 of any suitable well-known design. A microprocessor 310, of any suitable well-known design, may be used to process detector readouts, including but not limited to angular locations of different diffracted orders leading to diffraction grating pitches being calculated. Thus, light reflected from the sample 304 may be accurately measured.

Figure 16:
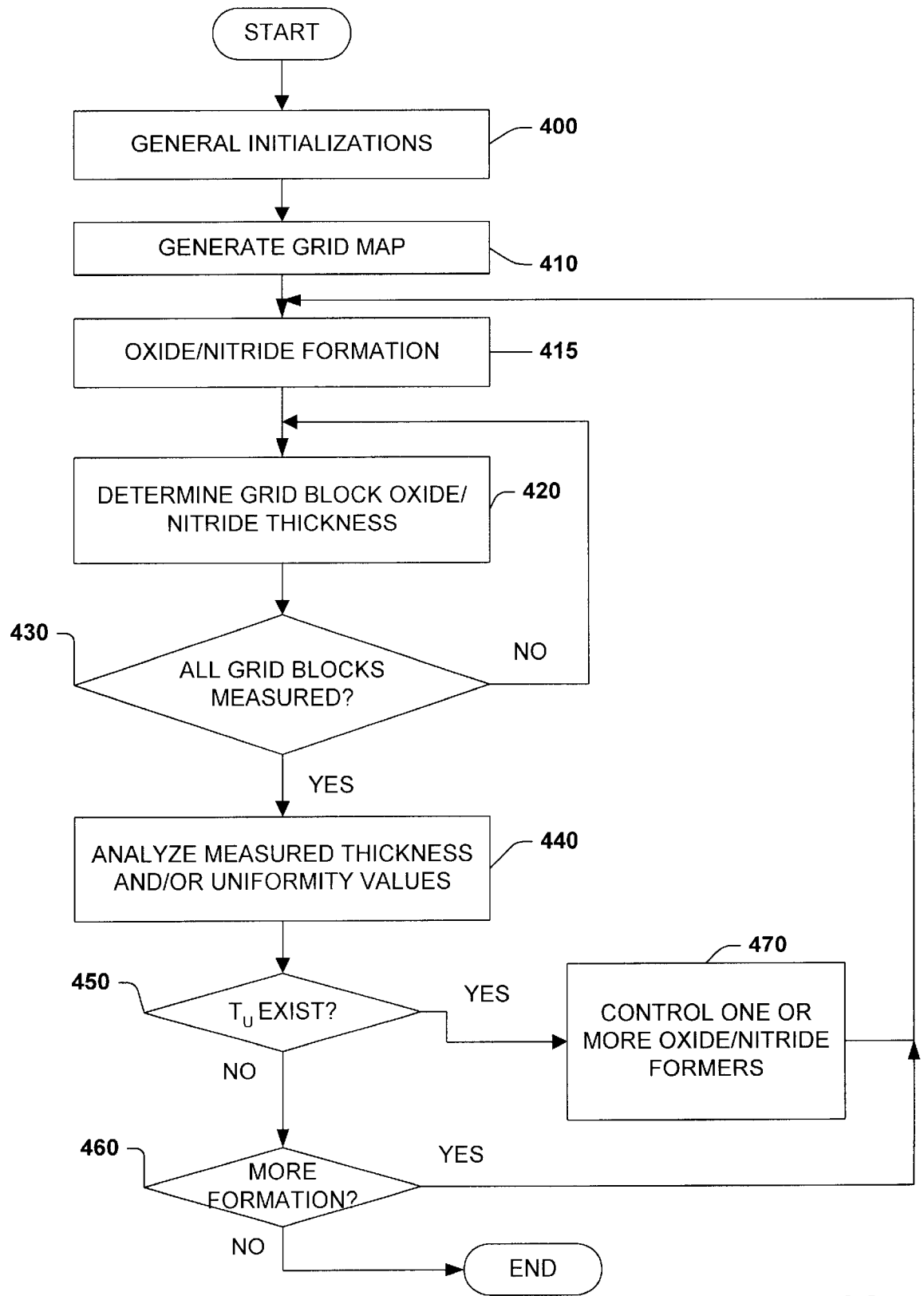
FIG. 16 is a flow diagram illustrating one specific methodology for carrying out the present invention.

In view of the exemplary systems shown and described above, a methodology, which may be implemented in accordance with the present invention, will be better appreciated with reference to the flow diagram of FIG. 16. While, for purposes of simplicity of explanation, the methodology of FIG. 16 is shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention.

FIG. 16 is a flow diagram illustrating one particular methodology for carrying out the present invention. At 400, general initializations are performed. Such initializations can include, but are not limited to, allocating memory, establishing pointers, establishing data communications, initializing variables and instantiating objects. At 410, at least a portion of a wafer is partitioned into a plurality of grid blocks "XY". At 415, at least a part of an oxide and/or nitride layer is formed. For example, a first oxide layer can be formed through oxide growth or deposition by CVD. A nitride layer can then be formed on the first oxide layer through nitride deposition (e.g. employing CVD). Then, a second oxide layer can be formed on the nitride layer through oxide deposition (e.g. employing CVD) or partial oxidation of the nitride.

At 420, thickness and/or uniformity determinations are made with respect to the various wafer portions mapped by respective grid blocks XY. At 430, a determination is made concerning whether all grid block measurements have been taken. If the determination at 430 is NO, then processing returns to 420. If the determination at 430 is YES, then at 440 the determined thickness and/or uniformity values are compared to acceptable thickness levels for the respective portions of the wafer. At 450, a determination is made concerning whether any unacceptable thickness and/or uniformity values exist. If the determination at 450 is NO, that all thickness and/or uniformity values are acceptable, then at 460 a determination is made concerning whether further formation is required. If the determination at 460 is NO, then processing completes. If the determination at 460 is YES, then processing continues at 415. If the determination at 450 was YES, that unacceptable thickness and/or uniformity values were found, then at 470 the unacceptable thickness and/or uniformity values are analyzed. After the analyses of step 470, feedback information can be generated to control oxide/nitride formers corresponding to grid blocks with unacceptable thickness and/or uniformity values, to regulate characteristics of oxide and/or nitride formation on the respective wafer portions. For example, information concerning the time remaining for oxide and/or nitride formation and/or the temperature at which such oxide and/or nitride formation should occur can be generated. The present iteration is then ended and the process returns to 415 to perform another iteration.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for regulating oxide/nitride (ON) dielectric formation in non volatile memory devices, comprising:
    at least one oxide/nitride former operative to form one or more oxide and/or nitride layers on a portion of a wafer;
    an oxide/nitride former driving system for driving the at least one oxide/nitride former;
    a system for directing light to the portion of the wafer;
    a measuring system for measuring parameters of ON formation thickness and uniformity based on light reflected from one or more ON formations; and
    a processor operatively coupled to the measuring system and the oxide/nitride former driving system, the processor receiving ON formation thickness and uniformity data from the measuring system and the processor using the data to at least partially base control of the at least one oxide/nitride former so as to continuously regulate ON thickness and uniformity on the portion of the wafer during formation of each layer thereon.

2. The system of claim 1, further operable to regulate oxide/nitride/oxide (ONO) dielectric formation in non-volatile memory devices, wherein:
    the measuring system is further operable to measure parameters of ONO formation thickness and uniformity based on light reflected from one or more ONO formations; and
    the processor further operable to receive ONO formation thickness and uniformity data from the measuring system and the processor using the data to at least partially base control of the at least one oxide/nitride former so as to continuously regulate ONO thickness and uniformity on the portion of the wafer.

3. The system of claim 1, the measuring system further including a scatterometry system for processing the light reflected from the one or more ON and/or ONO formations.

4. The system of claim 3, the processor being operatively coupled to the scatterometry system, the processor analyzing data relating to thickness and uniformity received from the scatterometry system, and the processor basing control of the at least one oxide/nitride former at least partially on the analyzed data.

5. The system of claim 1, the processor mapping the wafer into a plurality of grid blocks, and making a determination of ON and/or ONO formation thickness and uniformity at a grid block.

6. The system of claim 1, wherein the processor determines whether thickness and uniformity for at least a portion of the wafer are within an acceptable range.

7. The system of claim 6, wherein the processor controls the at least one oxide/nitride former to continuously regulate ON and/or ONO formation on the at least one portion to an acceptable value.

8. A system for regulating ON and/or ONO formation, comprising:
    first sensing means for sensing ON and/or ONO formation thickness of one or more of oxide and/or nitride layers;
    second sensing means for sensing uniformity of one or more of ON and/or ONO formations;
    forming means for forming one or more oxide and/or nitride layers; and
    controlling means for selectively controlling the forming means so as to regulate oxide and/or nitride formation.

9. A method for regulating ON and/or ONO formation, comprising:
    defining a wafer as a plurality of portions;
    establishing one or more ON and/or ONO formations to be formed;
    directing light onto at least one of the ON and/or ONO formations;
    collecting light reflected from at least one ON and/or ONO formation;
    analyzing the reflected light to determine thickness and uniformity of the at least one ON and/or ONO formation; and
    continuously controlling one or more oxide/nitride formers to regulate oxide and/or nitride formation of the at least one ON and/or ONO formation.

10. The method of claim 9, further comprising:

employing a scatterometry system to process the reflected light.

11. The method of claim 10, further comprising:

using a processor to control the at least one oxide/nitride former based at least partially on data received from the scatterometry system.

12. The method of claim 11, further comprising:

using a processor to continuously control the at least one oxide/nitride former based at least partially on data received from the scatterometry system.

13. A method for regulating ON and/or ONO formation, comprising:

partitioning a wafer into a plurality of grid blocks;

using one or more oxide/nitride formers to form one or more oxide and/or nitride layers on the wafer, each oxide/nitride former functionally corresponding to a respective grid block;

determining thickness and uniformity of the one or more ON and/or ONO formations on one or more portions of the wafer, each portion corresponding to a respective grid block; and using a processor to coordinate continuous control of the oxide/nitride formers, respectively, in accordance with determined oxide and/or nitride thickness and uniformity of the respective portions of the wafer.

* * * * *